Patented Feb. 14, 1928.

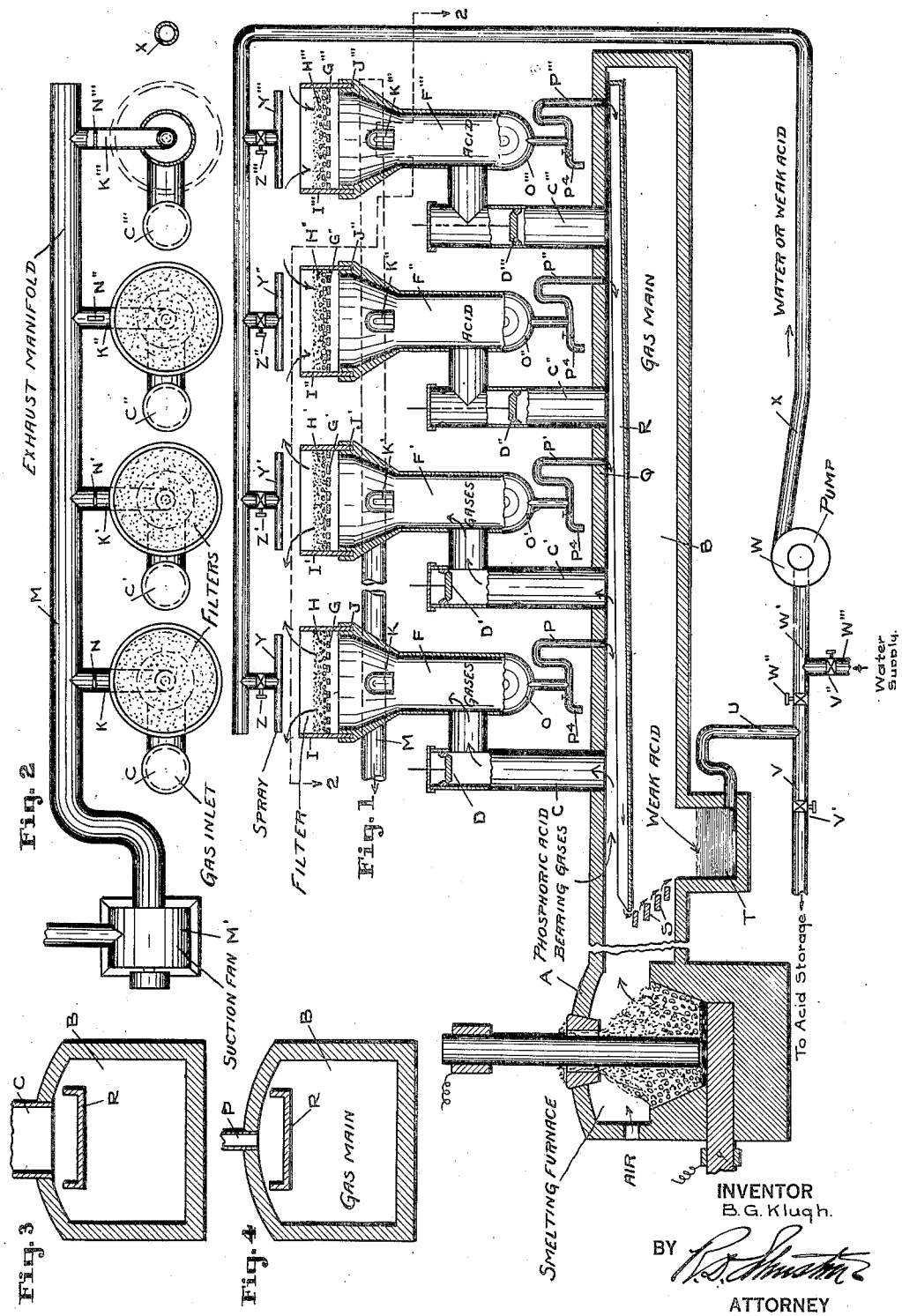

1,659,146

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

PROCESS FOR COLLECTING PHOSPHORIC ACID.

Application filed December 7, 1920, Serial No. 429,018. Renewed May 12, 1927.

This invention relates to improved methods for the production and collection of phosphoric acid by the smelting of phosphatic materials, carbonaceous reducing agents and silicious flux.

It has for its object a method of collection and concentration of the acid, which is more economical, subject to less delicate details of control, has fewer steps, and requires less elaborate equipment than that of the other processes in the existing state of the art.

In Letters Patent No. 1,492,713, issued to me on May 6th, 1924, I have described certain novel details in the smelting operation as conducted within the electric furnace. The methods of smelting described therein apply in the herein described process in all steps through the smelting, evolving of phosphorus, and oxidation of the elemental phosphorus evolved to phosphorous pentoxide and the carbon monoxide evolved to carbon dioxide.

The gases as passed out from the stock in the furnace will then contain $P_2O_5$, carbon dioxide and nitrogen. Water either from the stock as charged, or added to the gases, is required for the hydration of the $P_2O_5$ to phosphoric acid. The exit gases from the furnace are then cooled by any suitable means and are hereinafter called the phosphoric acid bearing gases.

The nitrogen and carbon monoxide in said gases exist and behave as perfect gases.
The phosphoric oxide carried in the gases is not a perfect gas and it is the peculiar property of this constituent upon which this invention is based, which invention I will now describe so that those skilled in the art may be enabled to make use thereof. The gases and phosphorus pentoxide contained therein, as derived from smelting operations using other than electrical sources of heat, are subject to the same treatment as that of the hereindescribed invention. I therefore claim my herein described process for treatment of phosphorus pentoxide bearing gases however produced.

Phosphoric acid is, as known in the arts, strongly acid in chemical character, and furthermore has a strong affinity for water. On the other hand, the form in which the phosphoric acid exists in the hereinabove described gases, has little affinity for alkaline solutions or for water in a liquid state. The phosphoric acid bearing gases may be passed through strong solutions of caustic potash or caustic soda with said solutions containing a hundred times as much alkaline reagent as is necessary to combine with the phosphoric acid in the gases subjected thereto with only slight absorption of the phosphoric acid which is passed (or bubbled) through the said alkaline solution. This fact is well known to all chemists who have attempted analysis of phosphoric acid content of the hereinabove described class of gases by the well known methods of gas absorptive analysis. The herein described process is much less costly than that in which water absorption of the acid is employed, since it eliminates the large quantity of water required to be circulated and the concentration step.

I have discovered that although the phosphoric acid in the form hereinabove described has the peculiar property of chemical inactivity toward alkaline solutions, it can nevertheless, be separated completely from its accompanying gases by passing the phosphoric acid bearing gases through a filter bed of solid granular or fibrous material, which presents a large area of contact through its apertures.

In practicing my invention, I pass the phosphoric acid bearing gases into a filter bed of solid material, said material being chemically inert to phosphoric acid. This material may be granular silica sand, asbestos fiber, carbon, finely spun or granulated phosphoric acid resisting metal, or any of many other available materials, the principle and functions being the same in the use of whatever available material is selected for the filter bed. The gases pass through the bed as such, and the phosphoric acid remains in the interstices and attached to the surfaces of the particles forming such filter bed. When an individual filter bed has become saturated to its full absorbing capacity, the phosphoric acid bearing gases are switched to another and fresh filter bed and the saturated bed has the phosphoric acid contained therein removed by any of several available means. For instance, air may be drawn through the bed downwardly, thus causing the phosphoric acid to pass out of the bed therewith and to be collected in a trap provided therefor.

It is of course obvious that the area of the filter bed must be such that the phosphoric acid bearing gases will pass therethrough at a sufficiently low velocity to permit deposition of the phosphoric acid. When the phosphoric acid is once deposited and comes to a state of rest, its character changes from the inactive fume state to a mobile liquid state, and thereafter behaves as such. Due to this property the phosphoric acid, after having been deposited, can be removed from the filter bed by passing a stream of air therethrough, and will readily separate from the air current after its passage therethrough in the same manner as any other liquid.
Other means by which the phosphoric acid may be removed from the filter bed after its deposition therein from the phosphoric acid bearing gases include, leaching out with water, and the subsequent concentration of the resultant weak acid by its passage through the hot phosphoric acid bearing gases, or the subsequent leaching with weak acids repeated to attain the desired acid concentration.
Referring to the drawings;

Fig. 1 is a vertical sectional elevation through the entire system of the electric furnace in which the smelting of the raw material is conducted.

Fig. 2 is a longitudinal horizontal section on the line 2—2 of Fig. 1.

Fig. 3 is a vertical cross section through the main for the phosphoric acid bearing gases showing one of the uptake conduit branches.

Fig. 4 is a similar view in cross-section through the gas main showing a weak acid return line.

Similar reference letters refer to similar parts throughout the drawings, in which A is an electric furnace in which the smelting is performed. The electric furnace shown is typical of any available smelting apparatus by means of which the phosphoric acid bearing gases to be treated can be produced. B is the gas main in which the phosphoric acid bearing gases pass for distribution from the furnace through the gas outlet pipes C, C', C'', C''', being selectively controlled for delivery through respective valves D, D', D'', D''', into respective filter chambers F, F', F'', F''', and through respective porous filter bottoms G, G', G'', G''', upon which is superimposed the respective filter beds H, H', H'', H'''. The filter pans I, I', I'', I''' are of separate construction and fit into annular seats J. Each filter chamber below the respective filters is connected by means of suction pipes K, K', K'', K''', into the suction manifold M and evacuated as desired by means of suction fan M', and each or any filter chambers are placed under suction as desired by valves N, N', N'', N'''. With valves set as in the drawings, the phosphoric acid bearing gases are passing to filters H, H', while filter H'' has the gas cut off from the main by valve D'' and is under air suction through pipe K'', showing valve N'' open, and also filter H''' is cut off from the gas main by valve D''' and also from the suction main by valve N'''. Each filter chamber F, F', F'', F''' is provided at its bottom with a respective acid basin O, O', O'', O''', which is discharged by means of its respective trap P, P', P'', P''' sealing against phosphoric acid bearing gases entering from the main B, and against the reduced pressure within when the chamber is under suction. Said traps discharge through roof Q of main B directly into acid trough R within said main. The acid trough R, being inclined, delivers the acid as removed from the filters into the top plate of a series of cascade plates S, over which the acid flows and is concentrated by passage of the hot phosphoric acid bearing gases therethrough, whereupon said acid flows over all the cascade plates into the receiving basin T. The acid thus concentrated is removed from basin T through trap U, whereupon it may be taken directly to storage through pipe V and valve V' or to pump W, in case further concentration is desired which is attained by forcing it through pipe X to the top of any of the filters for absorption of more phosphoric acid by leaching through the filter bed in which the deposition of acid directly from acid bearing gases has last occurred. The sprays Y, Y', Y'', Y''' provide means for delivering the weak acid or water, as desired, to the respective filter beds by control of valves Z, Z', Z'', Z'''. In case the acid deposited within the filter bed is of such concentration that it is desirable to use additional water for leaching it out of the filters, said water is supplied by closing valve W'' in pipe W' and opening valve V'' in the water supply pipe W'''. The acid may be taken directly from the chamber O, O', O'', O''' into which it flows from the filters and tapped off by means of valves P⁴ in case concentration or circulation is not desired.

From the foregoing description it may be readily seen that a number of alternative methods of operating the apparatus are possible.

In all cases the phosphoric acid bearing gases pass directly from the main to the filter bed, and the collection of the acid therein will continue to the saturation of the individual bed. The variations in operation will proceed from the point of absorption of the bed to saturation thereof. The concentration of the acid collected within the filter bed will be governed by the proportionate quantity of water vapor in the gases and the temperature of the gases as delivered to the filters. The concentration of the acid will be at a maximum with the temperature of the gases 150° C. to 200° C., because the water present at that temperature will all be present as vapor and will thus act as a perfect gas. However, at temperatures between 110° C. and 150° C., the $P_2O_5$ as deposited in the filter bed will absorb chemically a certain portion of water, since said $P_2O_5$ rapidly changes from the inert fume to the active chemical state when it becomes attached and quiescent. If the temperature of the gases be controlled between 150° C. and 160° C., the phosphoric acid deposited within the filter bed will be above 90% $H_3PO_4$, and of a syrupy consistency, so that no concentration will be necessary and it may be removed from the filter after discontinuing the gas current therethrough by drawing air downwardly through the filter bed and collecting said acid in the chamber directly below the filter.

In practical operation, the number of filters in service, into which the phosphoric acid bearing gases are passed simultaneously for the separation of the phosphoric acid therefrom will depend upon the volume of gas flowing so that the proper area of filter bed is provided to maintain the velocity of gases through the filter bed required for best operation. While the gases are passing through one set of filter beds, one or more filter beds are having the deposited acid removed therefrom and the various beds are thus passed through the continuous cycle of service.

The alternative procedures in operation after having the acid deposited within the filter bed are (1) Removal of the acid from the filter bed by drawing air downwardly through the bed into the chamber upon which the filter rests, and separating the said acid from the air so that it collects in the basin of said chamber, and tapping it off directly for use.

(2) Removal of the acid from the filter bed by leaching with water or dilute acid, the resulting leach liquors of medium strength acid being removed from the basin in the chamber below said filter for use.

(3) Removal of the acid from the filter bed by leaching with a weak acid, the resulting stronger acid leach being passed subsequently through further filters saturated with deposited acid progressively until the desired concentration of acid is produced, which is then removed for use.

(4) Removal of the acid deposited on the filter bed as weak acid, by drawing through said filter downwardly a current of air and allowing said acid to flow directly into the trough within the gas main and thence over cascade concentrating plates through which the phosphoric acid bearing gases flow, thereby giving up a portion of the phosphoric acid carried in said gases to said flowing acid to concentrate same to a limited extent, collecting the acid at this stage of concentration in a basin, removing and pumping it back to subsequently saturated filter beds, and recirculating to desired concentration.

(5) Removal of the acid from the filter bed by leaching with water (said acid being deposited thereon as strong acid) and delivering said removed weak acid through the cycle as in case 4 (above), and recirculating to the desired concentration.

(6) Removal of strong deposited acid from the filter bed by leaching with water, and providing for complete concentration of the acid so leached by causing it to flow over the trough and cascades within the hot phosphoric acid bearing gas main to final desired concentration without recirculation.

The advantages of this system over that of electrical precipitation or of tower collection lies in that the equipment required is simpler and does not require such delicate control. Each unit of the filtering elements is interchangeable with other units and is of simple design. This system will collect either weak or strong acid and permit concentration of the weaker acids if desired.

Absorption towers are expensive in construction, as well as inaccessible for repairs and cleaning, and since they depend upon the principle of a flowing film of liquid for the collection of the phosphoric acid from the gases, and since phosphoric acid as existing in the gases directly from the electric smelting operation is very inert in its affinity for water, the tower capacity required for efficient absorption is enormous. The simple filtering system herein described takes advantage of the peculiar property of said phosphoric oxide fume, and thus renders the simplified method herein described available.

One specific application of commercial value lies in the production of phosphorus and other metallic phosphide alloys in which phosphate rock, carbon, silica and the metal bearing material required are electrically smelted. There is always a portion of the phosphorus in the smelting charge which fails to combine in the furnace with the iron or other metal smelted, and said portion of the phosphorus is evolved from the top surface of the charge as elemental phosphorus. In an enclosed furnace, this said evolved phosphorus may be readily oxidized to $P_2O_5$, hydrated to a phosphoric acid, and subsequently collected on a suitable filter bed which may be composed of material which can be subsequently used as part of the charge, or of the entire charge and the evolved and oxidized phosphorus all collected on the said filter bed. The material forming the said filter bed will after said absorption and drying be agglomerated, thus reducing the portion of finely divided stock in the charge, and it is subsequently charged into the furnace. By this mode of procedure practically all of the phosphorus from the phosphate may be recovered in the alloy produced.

While I have described and illustrated in detail an apparatus suited for the carrying out of my process, such an apparatus is not claimed as a part of this application which is confined, responsive to divisional requirements, to the process itself.

This invention is not intended to be restricted in scope to the specific embodiments shown, but contemplates such modifications as come within the spirit and scope of the claims.

Having thus described my invention, what I claim as new and desire to secure by Letters Patent, is:—

1. A process of the character described, consisting in separating the phosphoric acid resulting from phosphatic material from its accompanying gases by passing the phosphoric acid bearing gases through a granular filter medium, and removing the phosphoric acid from the filter in which it is deposited by drawing a current of air through said filter and recollecting the phosphoric acid from said air.

2. A process for the collection of phosphoric acid, which consists in passing phosphoric acid bearing gases through a granular filter, removing the phosphoric acid collected in the filter, and passing said acid through phosphoric acid bearing gases to concentrate it.

3. A process for the collection of phosphoric acid, which consists in passing phosphoric acid bearing gases through a granular filter, removing the phosphoric acid collected in the filter, and utilizing said phosphoric acid as a leaching medium for the removal of other phosphoric acid collected in a filter.

4. A process for the collection of phosphoric acid, which consists in passing phosphoric acid bearing gases through a granular filter, removing the phosphoric acid collected by the filter, circulating said acid through a conduit for the phosphoric acid bearing gases, and returning said acid as a leaching medium to the filter.

5. A process for the collection of phosphoric acid, which consists in passing phosphoric acid bearing gases through a granular filter, removing the phosphoric acid collected in a filter by an air current, passing the recovered phosphoric acid through the phosphoric acid bearing gases to concentrate it, and returning the concentrated acid as a leaching medium to the filter.

6. A process for the collection of phosphoric acid, which consists in passing phosphoric acid bearing gases selectively through a series of filtering mediums, removing the phosphoric acid collected in one of the mediums, and circulating it through another medium as a leaching agent.

7. A process as described in claim 6, in which the circulating acid is partially concentrated by passing it through the phosphoric acid bearing gasses.

8. A process for the collection of phosphoric acid, which consists in smelting in a suitable furnace a charge comprising phosphatic silicious, carbonaceous, and metal bearing materials, oxidizing and hydrating the evolved phosphorus which fails to combine with the metal in the charge to convert such phosphorus into phosphoric acid in a fume state, and passing the said phosphoric acid along with the accompanying gases through a filter bed composed of material adapted to be used in the smelting charge.

9. A process for the collection of phosphoric acid according to claim 3, in which the phosphoric acid collected in the filter bed material suitable for use in the smelting charge is returned to the furnace for further treatment therein.

In testimony whereof I affix my signature.

BETHUNE G. KLUGH.